United States Patent [19]

Idowu

[11] Patent Number: 5,438,919
[45] Date of Patent: Aug. 8, 1995

[54] EGG SEPARATOR

[76] Inventor: Olajire Idowu, 1734 Mettler Rd., Lodi, Calif. 95242

[21] Appl. No.: 354,522

[22] Filed: Dec. 13, 1994

[51] Int. Cl.⁶ ........................... A23J 1/09; A47J 43/14
[52] U.S. Cl. .......................................... 99/499; 99/498
[58] Field of Search ................... 99/490, 495, 496–500, 99/478–480

[56] References Cited

U.S. PATENT DOCUMENTS

| | | | |
|---|---|---|---|
| 1,101,041 | 6/1914 | Schenk | 99/500 |
| 2,018,162 | 10/1935 | Weldon | 99/499 |
| 2,117,899 | 5/1938 | Meckler | 99/500 |
| 2,720,232 | 10/1955 | Denton | 99/500 |
| 4,463,666 | 8/1984 | Papp | 99/497 |
| 4,554,866 | 11/1985 | Hampton | 99/497 |
| 5,069,119 | 12/1991 | Idowu | 99/499 |

*Primary Examiner*—Timothy F. Simone
*Attorney, Agent, or Firm*—Robert Charles Hill

[57] ABSTRACT

A device for separating the yolk and albumen of an egg is provided. A housing includes an inner chamber and an outer chamber. A lid member is detachably coupled to an upper edge of the housing. The lid includes an annular member positioned above the inner chamber and a plurality of slots disposed adjacent to the annular member communicating with the outer chamber. The annular member is sized for retaining the yolk and for causing the albumen to overflow the annular member with the slots allowing the albumen to flow downwardly into the outer chamber. A lever is pivotally coupled to the annular member. The lever has a bottom portion abutting a bottom edge of the annular member for enabling dispensing of whole yolk retained in the annular member into the inner chamber without breaking the yolk. A funnel is detachably mounted on the lid. The funnel has a bottom opening positioned above the annular member for directing the egg to the annular member. A circumferential flange on a top edge of the funnel provides an anvil for breaking the shell of the egg prior to dispensing the egg in the funnel member. The housing may optionally be provided with a closeable spout communicating with the outer chamber. The spout provides facile removal of albumen retained in the outer chamber.

15 Claims, 2 Drawing Sheets

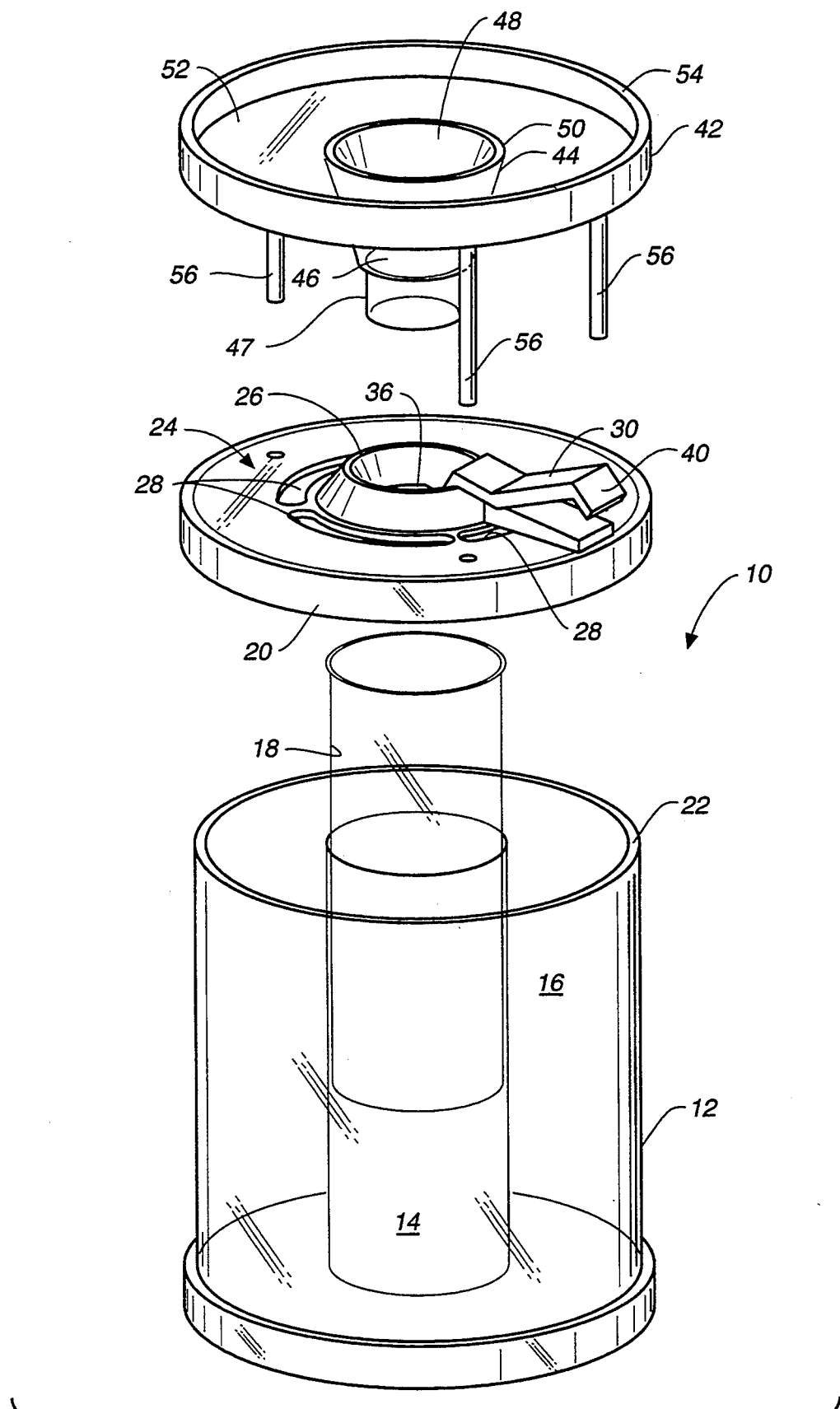
FIG._1

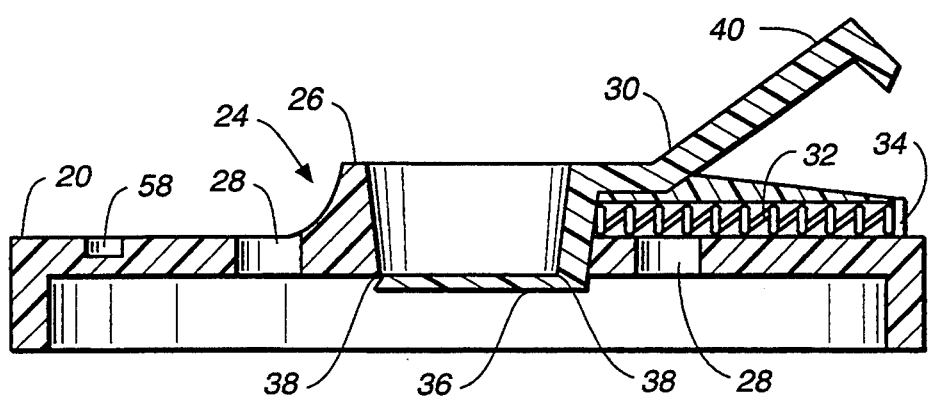
FIG._2
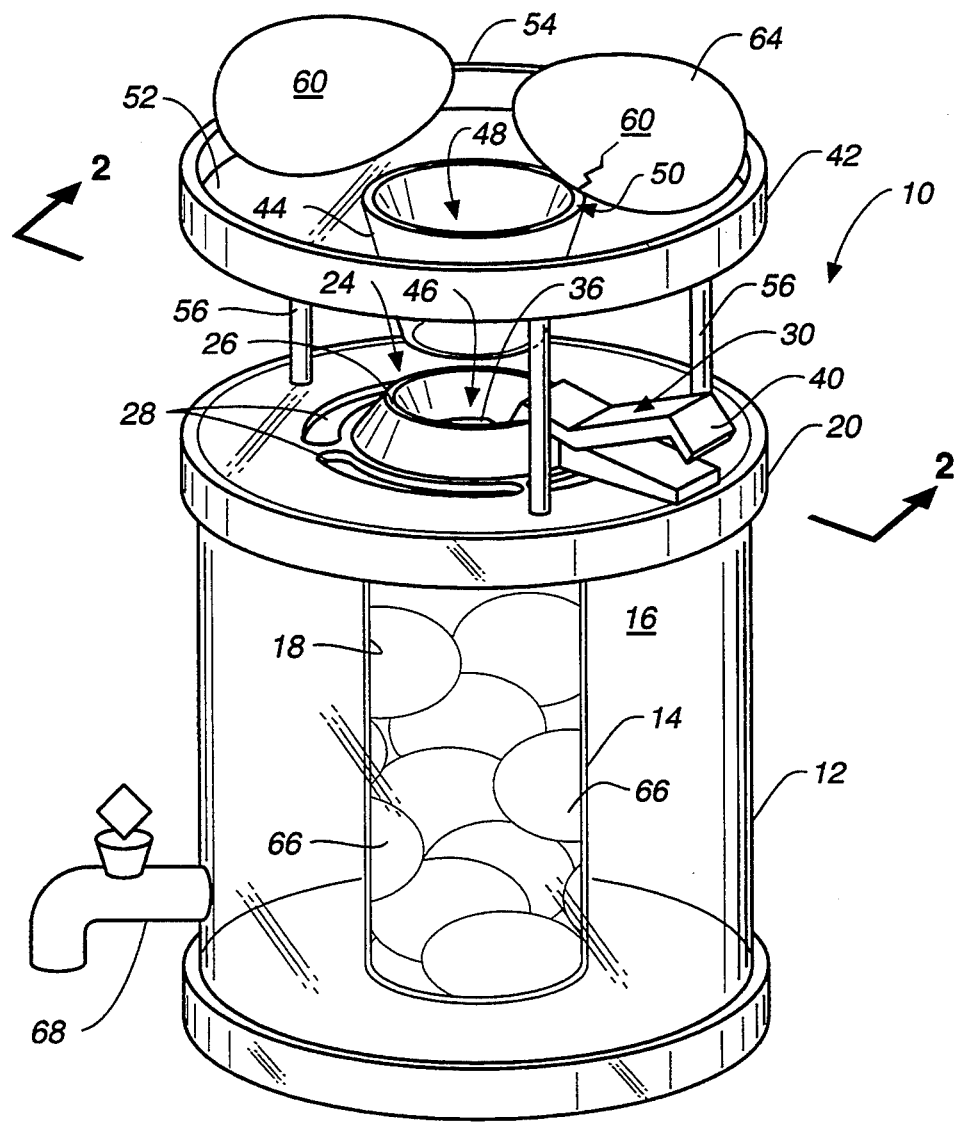
FIG._3

EGG SEPARATOR

BACKGROUND OF THE INVENTION

1. Field of the Invention

The present invention relates generally to devices for processing eggs, and more particularly, to an improved and simplified device for separating the yolk and albumen of a single egg or successive eggs.

2. Description of Related Art

A number of prior art devices have been provided for processing eggs, and particularly for separating the yolk and albumen of eggs. Many of these devices had to be held by hand, or suspended by some means, over a container for receiving the albumen. After separation of the albumen from the yolk, it was often necessary to remove the device from the container to discard or transfer the yolk from the device, prior to receiving the next egg therein.

Devices of the above mentioned type, which may include some of the features noted above are disclosed in, for example, U.S. Pat. Nos. 4,463,666, to Papp; 3,749,001, to Swett; and 3,656,525, to Goodart.

Additional devices for separating eggs appear to contemplate use were relatively large numbers of eggs may be separated. A disadvantage of these devices is that they are relatively complex and include a substantial number of moving parts. Such devices are disclosed, for example, in U.S. Pat. Nos. 4,919,042, to Rasmussen and 4,137,837 to Warren.

Still further examples of devices for separating eggs are disclosed in U.S. Pat. Nos. 4,799,423, to Willsey and 4,541,330, to Fujimura.

U.S. Pat. No. 5,069,119, issued Dec. 3, 1991, to Idowu, discloses an egg separator that includes a cup-shaped member in an upper portion of a unitary housing for receiving an egg, retaining the yolk, and allowing the albumen to overflow the cup-shaped member. The housing includes first and second chambers for receiving the albumen and yolk, respectively. The chambers are provided with inclined floors, that allow their respective contents to flow out of the chambers and into separate containers. A disadvantage of the disclosed device, it that a curved element movably mounted in the cup-shaped, was used to break yolks retained in the cup-shaped prior to being dispensed in the second chamber. Thus, whole yolks could not be used if it was desired, and further, the device was somewhat inefficient with the processing of yolks. A further disadvantage of the disclosed device is that it did not provide temporary storage of separated eggs.

Although the devices disclosed in the above enumerated prior art references have improved features, they fail to disclosed all of the advantageous features achieved by the present invention. There therefore exists a need for a device for separating the yolk and albumen of an egg, or a succession of eggs, that is unitary in construction and retains yolk intact after separation from the albumen.

OBJECTS OF THE INVENTION

It is therefore an object of the present invention to provide an improved and simplified device for separating the yolk and albumen of an egg or a succession of eggs, that retains yolk intact after separation from the albumen and provides temporary storage of one or more separated eggs;

It is another object of the present invention to provide a device for separating the yolk and albumen of an egg or a succession of eggs that may be assembled and-disassembled by hand;

It is a further object of the present invention to provide a device for separating the yolk and albumen of an egg or a succession of eggs that includes a funnel means for directing the egg into separating means that has a platform for retaining one or more eggs thereon; and It is still another object of the present invention to provide a device for separating the yolk and albumen of an egg or a succession of eggs that is of a simple and unitary construction.

SUMMARY OF THE INVENTION

These and other objects and advantages of the present invention are achieved by providing an improved and simplified device for separating the yolk and albumen of an egg or succession of eggs. The invented device includes a housing comprising an inner chamber and an outer annular chamber. The inner chamber is dimensioned to hold a plurality of whole yolks and may have a cylindrical sleeve removably disposed therein to aid with removing yolks therefrom. The housing may further be provided with a closeable spout communicating with the outer chamber. The spout provides facile removal of albumen retained in the outer chamber.

A lid member is detachably coupled to an upper edge of the housing for substantially enclosing the housing and providing a means for separating the yolk and albumen of the egg. The lid includes an annular member positioned above the inner chamber and a plurality of slots disposed adjacent to the annular member communicating with the outer chamber. The annular member is sized for receiving and retaining the yolk, and for causing the albumen to overflow the annular member with the slots allowing the albumen to flow downwardly into the outer chamber.

A lever member is pivotally coupled to the annular member and a spring is interposed between the lever member and the lid member. The spring biases the lever member into a closed position to prevent yolk from inadvertently flowing through the annular member and into the inner chamber. The lever member has a bottom portion that abuts a bottom edge of the annular member. The bottom portion may be disc-shaped to enclose the bottom edge of the annular member. The lever member enables dispensing of whole yolk retained in the annular member into the inner chamber without breaking the yolk.

A funnel is detachably mounted on the lid member. The funnel has a bottom opening positioned above the annular member for directing the egg to the annular member. The funnel includes a top opening with a circumferential flange on the edge thereof. The flange provides an anvil means for breaking the shell of the egg prior to dispensing the egg in the funnel. The funnel further includes an annular platform for holding one or more eggs thereon prior to breaking the eggs. The platform has a plurality of legs for detachably supporting the funnel on the lid member.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is an exploded side elevational view of a preferred embodiment of the device of the present invention, shown partially in phantom;

FIG. 2 is cross-sectional side elevational view of a lid member of the preferred embodiment; and FIG. 3 is a side view of the device of the present invention, shown partially in phantom.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Referring now to FIG. 1 and FIG. 2 of the drawings, there is shown generally at 10 a device for separating the yolk and albumen of an egg constructed according to the principles of the present invention. The device 10 includes a housing 12 comprising an inner chamber 14 and an outer annular chamber 16. The inner chamber 14 is dimensioned to hold a plurality of whole yolks (shown in FIG. 3). The inner chamber 14 may include a cylindrical sleeve 18 removably disposed therein to provide facile removing of yolks from the inner chamber 14.

A lid member 20 detachably couples to an upper edge 22 of the housing 12. The lid member 20 substantially encloses the housing 12, to provide for temporary storage of separated egg yolks and albumens, and further provides an egg separating means shown generally at 24. The egg separating means 24 includes an annular member 26 and a plurality of slots 28 disposed through the lid 20 adjacent to the annular member 26. The annular member 26 is positioned above the inner chamber 14, when the lid 20 is coupled to the housing 12, while the slots 28 communicate with the outer chamber 16. The annular member 26 is sized for receiving and retaining the yolk, and for causing the albumen to overflow the annular member 26, with the plurality of slots 28 allowing the albumen to flow downwardly into the outer chamber 16. The housing 12 and lid 20 may comprise suitable portions of a substantially light, rigid, sturdy material, that enables the lid 20 to be snap-fitted to the housing 12. In the preferred embodiment, the housing 12 and lid 20 each comprise a suitable plastic that is molded as a unitary portion.

A lever member 30 is pivotally coupled to the annular member 26. A spring 32 (shown in FIG. 2) is compressed between the lever member 30 and a portion 34 of the lid 20. The spring 32 biases the lever member 30 into a closed position to prevent the yolk from inadvertently flowing into the inner chamber 14. The lever member 30 includes a bottom portion 36 that abuts a bottom edge 38 of the annular member 26 and a handle 40. The handle 40 may be configured to extend obtusely from the lid 20 (best seen in FIG. 2). In the preferred embodiment, the bottom portion 36 of the lever 30 is substantially disc-shaped and enables dispensing of whole yolk retained in the annular member 26 into the inner chamber 14 without breaking the yolk and prevents yolk from inadvertently flowing through the annular member 26 and into the inner chamber 14.

Referring now to FIG. 1, a funnel means 42 detachably mounts on the lid member 20. The funnel means 42 includes a funnel 44 that has a bottom opening 46 positioned above the annular member 26 for directing the egg to the annular member 26 and a top opening 48. The bottom opening 46 may include an integrally formed guide member 47 that extends downwardly therefrom. The guide member 47 may be substantially cylindrical, and inhibits egg from flowing over the separating means 24 and on to the lid 22. The top opening 48 has a circumferential flange 50 on the edge thereof providing an anvil means for breaking the shell of the egg prior to dispensing the egg in the funnel 44.

The funnel means 42 further includes an annular platform 52 that extends around the funnel 44. In the preferred embodiment, the platform is provided with a shoulder 54 formed on the periphery thereof for retaining one or more eggs placed on the platform 52. The platform 52 has a plurality of downwardly extending legs 56 for detachably supporting the funnel means 42 on the lid 20. The lid 20 may include a substantially small cavity or aperture 58, to enable the legs 56 to snap-fit to the lid 20 for supporting the funnel means 42. The funnel means 42 may comprise any suitable, substantially rigid, sturdy plastic, for example, that can be molded as a unitary portion.

Referring now to FIG. 3 of the drawings, the device 10 of the present invention may be used, by first sliding the inner sleeve 18 into the inner chamber 14. The lid 20 is then snap-fit onto the housing 12. The funnel means 42 is then mounted on the lid 20. Eggs 60 to be used may be placed on the platform 52 if so desired. The egg 60 to be separated is then struck against the anvil means 50 to break the shell 64 of the egg 60. After the shell 64 is broken, the yolk 66 and albumen (not shown) flow downwardly through the funnel 44 and guide member 47.

The annular member 26 receives the yolk 66 of the egg 60, while the albumen overflows the annular member 26 and flows into the outer chamber 16 through the slots 28. The lever member's handle 40 is pivoted upward to pivot its bottom portion 36 away from the annular member 26 to release the yolk 66 from the annular member's bottom edge 38. Thus, the yolk 66 is dispensed into the inner chamber 14 without breaking the yolk 66.

Optionally, the housing 12 may be provided with a closeable spout 68 that communicates with the outer chamber 18. The spout 68 enables albumen to be removed from the outer chamber 18 without removing the lid 20 and funnel means 42 from the housing 12.

Thus, there has been described an improved simplified device for separating the yolk and albumen of an egg, or succession of eggs. The inner chamber is dimensioned to hold a plurality of whole yolks, while the inner sleeve aids with removing yolks from the inner chamber. The annular member is sized for receiving and retaining the yolk and causes the albumen to overflow the annular member, with the slots allowing the albumen to flow downwardly into the outer chamber. The bottom portion of the lever member enables dispensing of whole yolk retained in the annular member into the inner chamber without breaking the yolk. The funnel includes an anvil means for breaking the shell of the egg prior to dispensing the egg in the funnel member. The funnel further includes a platform for holding one or more eggs thereon prior to breaking the eggs.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A device for separating the yolk and albumen of an egg comprising:
   a housing comprising an inner chamber and an outer chamber;
   separating means detachably coupled to an upper portion of said housing for receiving an egg and separating the yolk and albumen of the egg, said separating means including retaining means for retaining the yolk therein and causing the albumen to overflow said retaining means and flow downwardly into said outer chamber;
   means pivotally coupled to said separating means for selectively dispensing whole yolk retained in said retaining means into said inner chamber; and
   funnel means detachably mounted on said separating means, said funnel means positioned above said separating means for directing the egg to said separating means.

2. The device of claim 1 wherein said separating means includes an annular member sized for receiving and retaining the yolk and for causing the albumen to overflow the annular member, said separating means including a plurality of slots adjacent said annular member communicating with said outer chamber for allowing the albumen to flow downwardly into said chamber.

3. The device of claim 2 wherein said selective dispensing means comprises a lever member pivotally coupled to said annular member and a spring coupled to said separating means, said spring biasing said lever member into a normally closed position, said lever member having a bottom portion abutting a bottom edge of said annular member for enabling selective dispensing of whole yolk retained in said annular member into said inner chamber upon pivoting said lever member.

4. The device of claim 3 wherein said funnel means includes a bottom opening positioned above said annular member for directing the egg to said annular member and a top opening, said top opening having a flange on the edge thereof providing an anvil means for breaking the shell of the egg prior to dispensing the egg in said funnel means.

5. The device of claim 4 wherein said funnel means includes an integrally formed, substantially cylindrical guide member extending downwardly from the bottom opening thereof for inhibiting egg from flowing over said separating means.

6. The device of claim 4 wherein said funnel means further includes an annular platform extending thereabout with a shoulder formed on the periphery thereof for retaining one or more eggs placed thereon, said platform having a plurality of downwardly extending legs for supporting said funnel means on said separating means.

7. The device of claim 1 further including a sleeve removably disposed in said inner chamber for removing one or more yolks retained in said sleeve from said inner chamber.

8. A device for separating the yolk and albumen of an egg, said device comprising:
   a housing comprising an inner chamber and an outer annular chamber;
   a lid member detachably coupled to an upper portion of said housing, said lid member including an annular member sized for receiving the yolk of a single egg and for causing the albumen thereof to overflow the annular member and a plurality of slots disposed adjacent to said annular member communicating with said outer chamber for allowing the albumen to flow downwardly into said outer chamber;
   dispensing means for selectively dispensing yolk retained in said annular member into said inner chamber, said dispensing means including a lever member pivotally coupled to said annular member for enabling dispensing of the yolk into the inner chamber without breaking said yolk; and
   a funnel member detachably mounted on said lid member, said funnel positioned above said annular member for directing the egg to the annular member, said funnel including a circumferential flange at an upper edge thereof providing an anvil means for breaking the shell of the egg.

9. The device of claim 8 wherein said dispensing means further includes a spring coupled to said lid member and biasing said lever member into a normally closed position, said lever member having a disc-shaped bottom portion abutting a bottom edge of said annular member for enabling dispensing of a whole yolk retained in said annular member into said inner chamber upon pivoting said lever member.

10. The device of claim 8 wherein said funnel member further includes an annular platform extending thereabout with a shoulder formed on the periphery thereof for retaining one or more eggs placed thereon, said platform having a plurality of legs for supporting said funnel member on said lid member.

11. The device of claim 10 wherein said funnel member includes an integrally formed, substantially cylindrical guide member extending downwardly from the bottom opening thereof for inhibiting egg from flowing over said annular member and onto said lid member.

12. The device of claim 8 further including a cylindrical sleeve removably disposed in said inner chamber for removing one or more yolks retained in said sleeve from said inner chamber.

13. An egg separator comprising:
   a housing comprising an inner chamber and an outer annular chamber, said inner chamber dimensioned to hold a plurality of whole yolks therein, said inner chamber including a cylindrical sleeve removably disposed therein for removing yolks from said inner chamber;
   a lid member detachably coupled to an upper edge of said housing for substantially enclosing said housing, said lid member including an annular member positioned above said inner chamber and a plurality of slots disposed adjacent to said annular member communicating with said outer chamber, said annular member sized for receiving the yolk and for causing the albumen to overflow the annular member with said slots allowing the albumen to flow downwardly into said outer chamber;
   a lever member pivotally coupled to said annular member and a spring interposed between said lever member and said lid member, said spring biasing said lever member into a closed position, said lever member having a disc-shaped bottom portion abutting a bottom edge of said annular member for enabling dispensing of whole yolk retained in said annular member into said inner chamber without breaking said yolk; and a funnel means detachably mounted on said lid member, said funnel means having a bottom opening positioned above said annular member for directing the egg to said annular member and a top opening with a circumferential flange on the edge thereof providing an anvil means for breaking the shell of the egg prior to dispensing the egg in said funnel means, said funnel means further including an annular platform extending therearound with a shoulder formed on the periphery thereof for retaining one or more eggs placed thereon, said platform having a plurality of downwardly extending legs for detachably supporting said funnel means on said lid member.

14. The device of claim 13 wherein said funnel means includes an integrally formed, substantially cylindrical guide member extending downwardly from the bottom opening thereof for inhibiting egg from flowing over said annular member and onto said lid member.

15. The device of claim 13 further including a closeable spout communicating with said outer chamber, said spout providing facile removal of albumen from said chamber without removing said lid member from said housing.

* * * * *